(12) United States Patent
Maor et al.

(10) Patent No.: US 10,342,312 B2
(45) Date of Patent: Jul. 9, 2019

(54) LICE REMOVAL DEVICE

(71) Applicant: Moshe Maor, Welshpool (AU)

(72) Inventors: Moshe Maor, Welshpool (AU);
Edward Joseph Khoury, Bateman (AU)

( * ) Notice: Subject to any disclaimer, the term of this patent is extended or adjusted under 35 U.S.C. 154(b) by 364 days.

(21) Appl. No.: 15/100,069

(22) PCT Filed: Nov. 27, 2014

(86) PCT No.: PCT/AU2014/001079
§ 371 (c)(1),
(2) Date: May 27, 2016

(87) PCT Pub. No.: WO2015/077824
PCT Pub. Date: Jun. 4, 2015

(65) Prior Publication Data
US 2017/0258197 A1 Sep. 14, 2017

(30) Foreign Application Priority Data

Nov. 29, 2013 (AU) .............................. 2013904649

(51) Int. Cl.
| A45D 24/00 | (2006.01) |
| A45D 24/30 | (2006.01) |
| A45D 24/32 | (2006.01) |
| A01K 13/00 | (2006.01) |
| B01D 46/24 | (2006.01) |
| F16K 7/17 | (2006.01) |

(52) U.S. Cl.
CPC ............ *A45D 24/30* (2013.01); *A01K 13/002* (2013.01); *A45D 24/007* (2013.01); *A45D 24/32* (2013.01); *B01D 46/2403* (2013.01); *B01D 2271/027* (2013.01); *B01D 2279/00* (2013.01); *F16K 7/17* (2013.01)

(58) Field of Classification Search
CPC ...... A45D 24/30; A45D 24/007; A45D 24/32; A01K 13/002; B01D 46/2403; B01D 2271/027; B01D 2279/00; F16K 7/17
See application file for complete search history.

(56) References Cited

U.S. PATENT DOCUMENTS 3,981,313 A * 9/1976 Burke .................... A45D 20/52
132/118
4,485,583 A * 12/1984 Planty .................. A01K 13/002
15/327.1
(Continued)

*Primary Examiner* — Rachel R Steitz
(74) *Attorney, Agent, or Firm* — Tope-McKay & Associates

(57) ABSTRACT

A lice removal device (10) comprising a main housing (12) including a first aperture (15) at a first end (14) thereof and a second aperture (17) at a second end (16) thereof. A fan unit (18) is provided within the main housing (12) to draw air in through the first aperture (15) and expel air outwardly through the second aperture (17) A comb unit (43) is securable to the first end of the main housing (12), the comb unit (34) comprising a comb housing (36) and a blade unit (38). The blade unit (38) includes a first side member (46) having a plurality of teeth (44) extending outwardly therefrom and a second side member (48) located adjacent and parallel to the first side member (46) to define an elongate opening (50) such that air is drawn across a first side of the teeth (44) and into the elongate opening (50).

20 Claims, 7 Drawing Sheets

(56) References Cited

U.S. PATENT DOCUMENTS

| | | | | |
|---|---|---|---|---|
| 4,799,460 A | * | 1/1989 | Kuhl | A01K 13/001 119/606 |
| 5,211,131 A | * | 5/1993 | Plyler | A01J 7/04 119/606 |
| 5,353,817 A | * | 10/1994 | Kantor | A01K 13/002 119/625 |
| 2011/0308034 A1 | * | 12/2011 | Powers | A01K 13/002 15/324 |

* cited by examiner

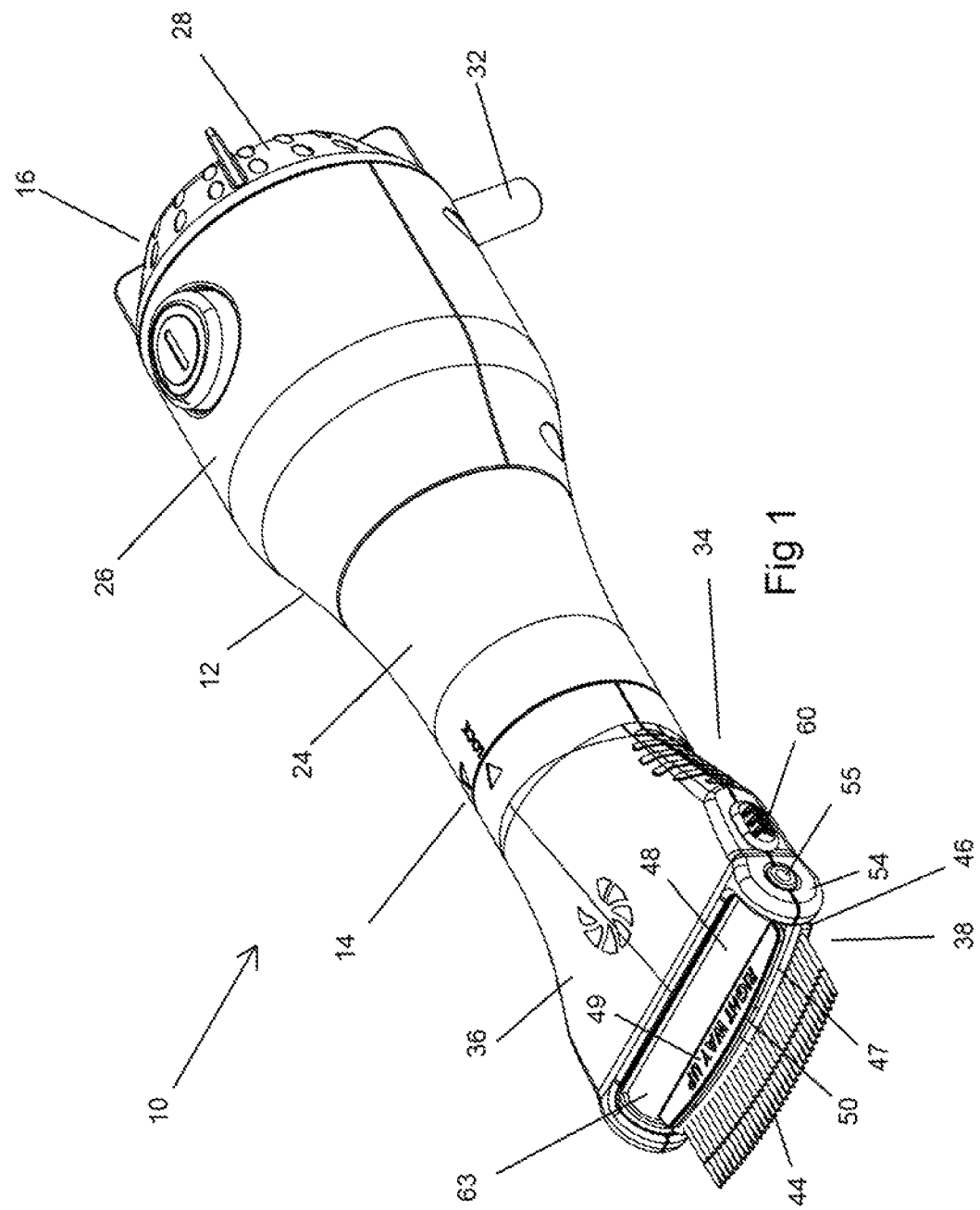

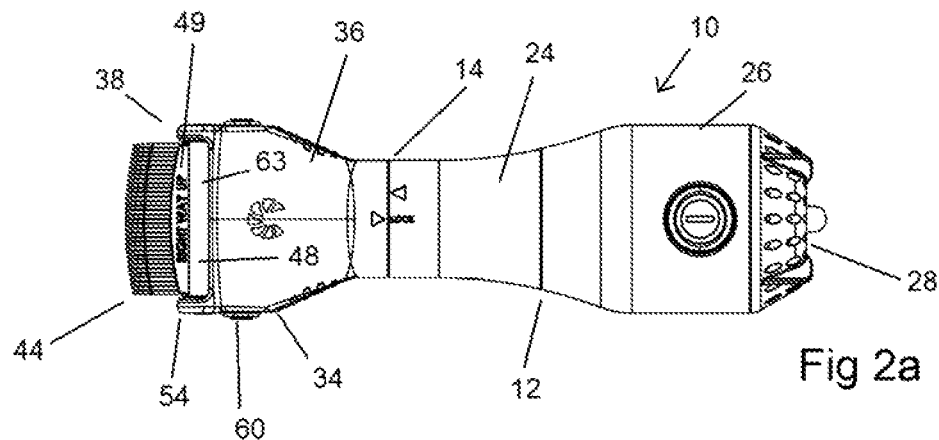
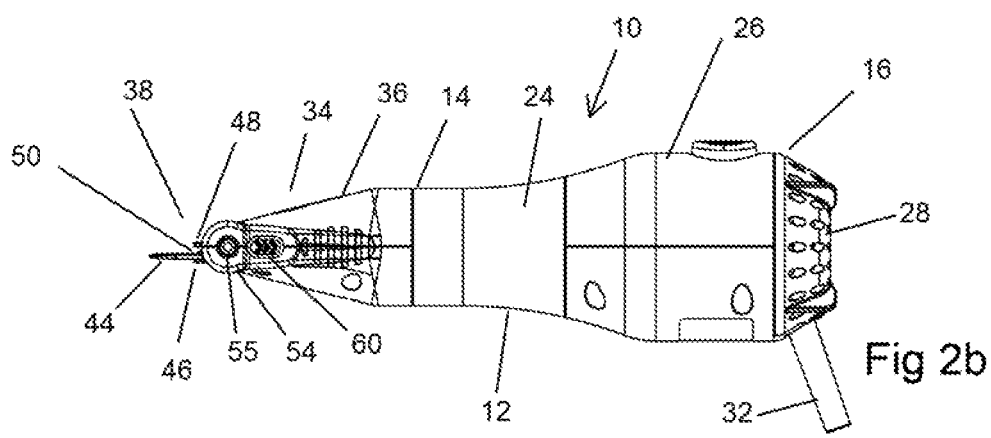
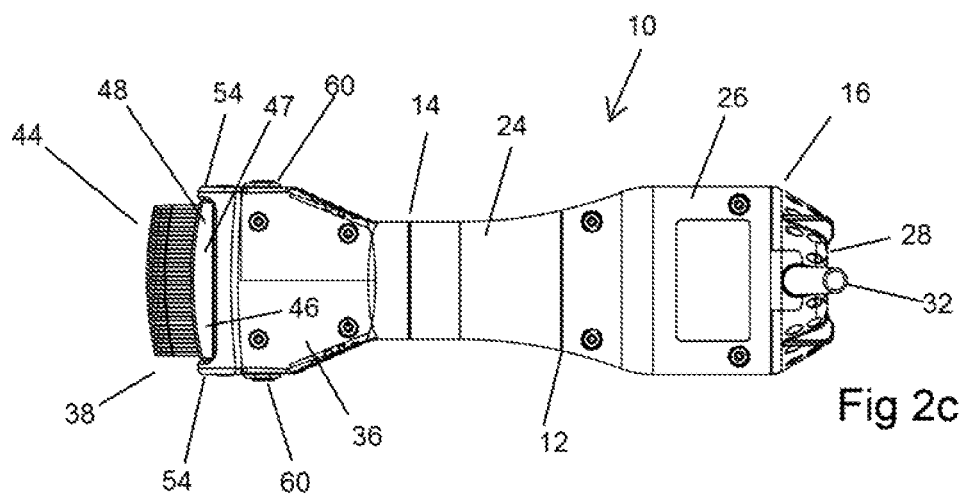

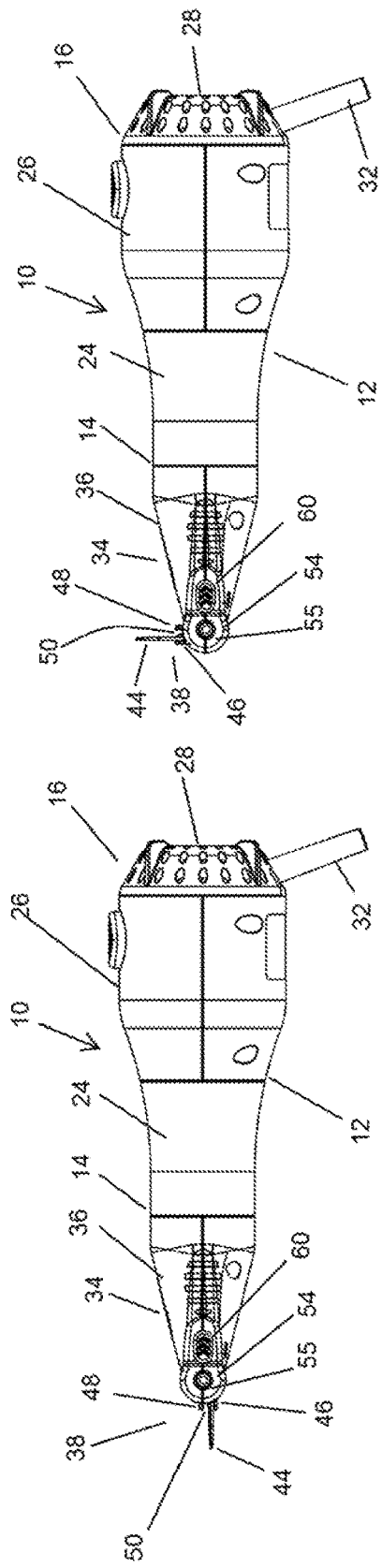

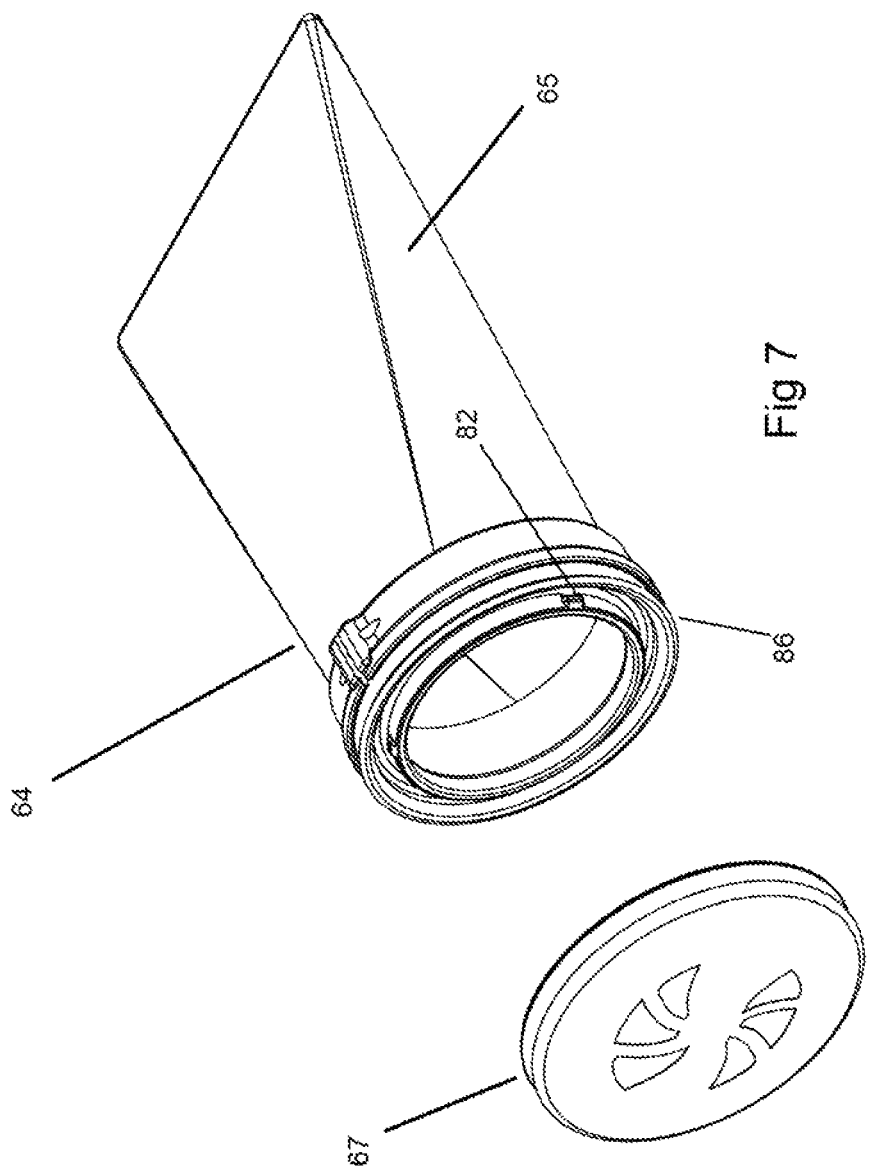

LICE REMOVAL DEVICE

FIELD OF THE INVENTION

The present invention relates to a device for removing lice from hair.

BACKGROUND TO THE INVENTION

Removal of lice from hair most commonly involves using a comb device which traps lice in the teeth. Standard comb devices have the disadvantage that the lice are not captured and can therefore escape, to potentially reinfest the hair.

Various devices have attempted to overcome this problem by including means to either kill or permanently capture the lice. Some of these devices include a vacuum arrangement in which the comb is formed as an attachment to a vacuum hose to draw the lice from the teeth of the comb into a containment chamber.

The present invention relates to such a vacuum device for removing and capturing lice. The device of the present invention includes improved features aimed at allowing more efficient capturing, trapping and disposing of the lice.

SUMMARY OF THE INVENTION

According to one aspect of the present invention there provide a lice removal device comprising:
a main housing including a first aperture at a first end thereof and a second aperture at a second end thereof;
a fan unit provided within the main housing to draw air in through the first aperture and expel air outwardly through the second aperture; and
a comb unit securable to the first end of the main housing, the comb unit comprising a comb housing and a blade unit; and
a plurality of teeth extending outwardly from adjacent an elongate opening in the blade unit such that air is drawn across a first side of the teeth and into the elongate opening;
wherein the blade unit is mounted for rotation relative to the comb housing.

Preferably the blade unit comprises a body from which the plurality of teeth extend and wherein the body is mounted within an elongate aperture on an end of the comb housing remote from the main housing.

In a preferred embodiment, the body comprises first and second side members each including respective first and second planar portions such that the first and second planar portions define the elongate opening.

Preferably the first and second side members also include respective first and second arcuate portions on sides thereof opposite the teeth, the arcuate portions being provided to seal across the elongate aperture in the comb housing such that air is directed to enter the comb unit via the elongate opening.

Preferably the arcuate portions are each located to define a cylindrical shape having the elongate opening adjacent a first side and a further elongate opening adjacent a second opposed side such that air drawn into the elongate opening exits through the opposite further elongate opening.

In one embodiment, first and second end members connect adjacent ends of the arcuate portions of the first and second side members, the end members being rotatably mounted to mounting portions provided on the comb housing adjacent ends of the elongate aperture.

Preferably the end members are circular and include outwardly facing lugs to engage into holes in the mounting portions such that the blade unit is rotatably mounted across the elongate aperture.

In one embodiment, the blade unit is mounted for rotation relative to the comb housing such that the teeth can move between a position in which the teeth are generally parallel to the longitudinal axis of the main housing and one or more positions in which the teeth are at an angle relative to the longitudinal axis of the main housing.

In a preferred embodiment, the comb unit includes also a latch member which is moveable to fax the blade unit in a plurality of angular orientations relative to the comb housing.

Preferably the latch member is mounted for sliding movement within the comb housing and includes lugs provided to engage into notches provided around the periphery of the end members of the blade unit in a first position and to disengage from the notches in a second position.

In a preferred embodiment, the latch member includes protrusions on sides thereof which protrude out through slots in the comb housing such that the protrusions can be gripped to move the latch member between the first and second positions.

In a preferred embodiment, a filter is received in the first aperture of the main housing to capture lice as air is drawn in from the comb housing and through the main housing.

Preferably the filter comprises a tubular receptacle having an open first end and a closed second end.

Preferably the filter is provided with a cap to engage with and seal across a neck portion of the filter. In one embodiment, the filter includes one or more rings of adhesive material on an inner surface to trap lice received in the filter.

In a preferred embodiment, a gate valve is provided adjacent the first end of the main housing such that air drawn into the main housing causes the gate valve to open and the gate valve closes when not air is flowing to prevent escape of lice.

Preferably the gate valve comprises a flexible disc mounted within a mounting, the mounting comprises a ring having a cross member extending diametrically across the ring such that airflow into the main housing flexes the gate from a closed position, in which the gate seals across the first aperture, to an open position in which sides of the gate flex around the cross member, thereby allowing air flow into the main housing.

In a preferred embodiment the main housing comprises a first housing portion adjacent the first end and a second housing portion located adjacent the second end, wherein each of the first and second housing portions comprises a tubular member of circular transverse cross section and the second housing portion includes the fan unit therein.

Preferably the main housing is tapered adjacent the first end thereof such that the first end is of a reduced cross sectional area relative to the second end.

Preferably the first housing portion tapers inwardly from adjacent the second housing portion to the first end and the second housing portion includes an inwardly tapering portion adjacent the first housing portion.

In one embodiment, the second end of the main housing includes a cover member secured across the second opening having a plurality of holes to allow air flow.

In one embodiment, a power cord extends through the cover member 28 connects to the motor to provide power to drive the motor.

In one embodiment, a grill is provided adjacent the fan unit on a side thereof adjacent the first housing portion

BRIEF DESCRIPTION OF THE DRAWINGS

The invention will now be described, by way of example, with reference to the following drawings, in which:

FIG. 1 is an upper perspective view of a lice removal device in accordance with the present invention;

FIG. 2a is a top view of the lice removal device of FIG. 1;

FIG. 2b is a side view of the lice removal device of FIG. 1

FIG. 2c is a bottom view of the lice removal device of FIG. 1;

FIG. 6a is a side view of the lice removal device of FIG. 1 with the blade unit in a first position;

FIG. 6b is a side view of the lice removal device of FIG. 1 with the blade unit in a second position; and FIG. 7 is view of the filter of he lice removal device of FIG. 1.

DETAILED DESCRIPTION OF PREFERRED EMBODIMENTS

Figure 3B:
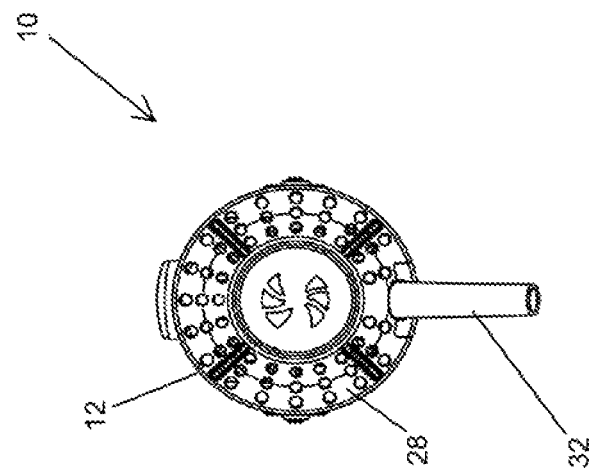
FIG. 3b is a rear view of the lice removal device of FIG. 1.
Figure 3A:
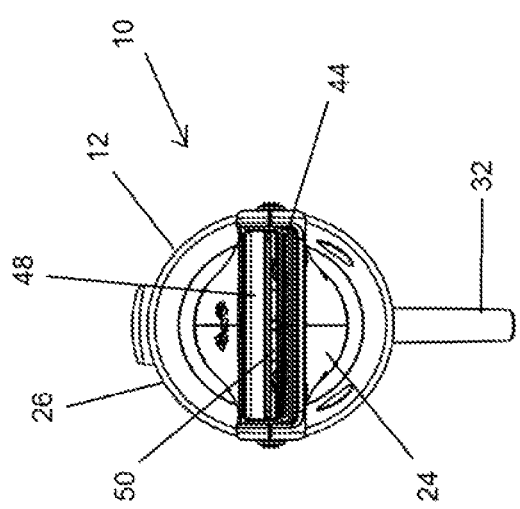
FIG. 3a is a front view of the lice removal device of FIG. 1.

Referring to the Figures, there is shown a lice removal device 10 comprising a main housing 12 having a first end 14 and a second end 16. The main housing 12 is circular in transverse cross section and includes a first aperture 15 at the first end 16 and a second aperture 17 at the second end 16.

The main housing 12 in the embodiment shown comprises a first housing portion 24 adjacent the first end 14 and a second housing portion 26 located adjacent the second end 16. Each of the first and second housing portions 24 and 26 comprises a tubular member of circular transverse cross section.

Figure 4:
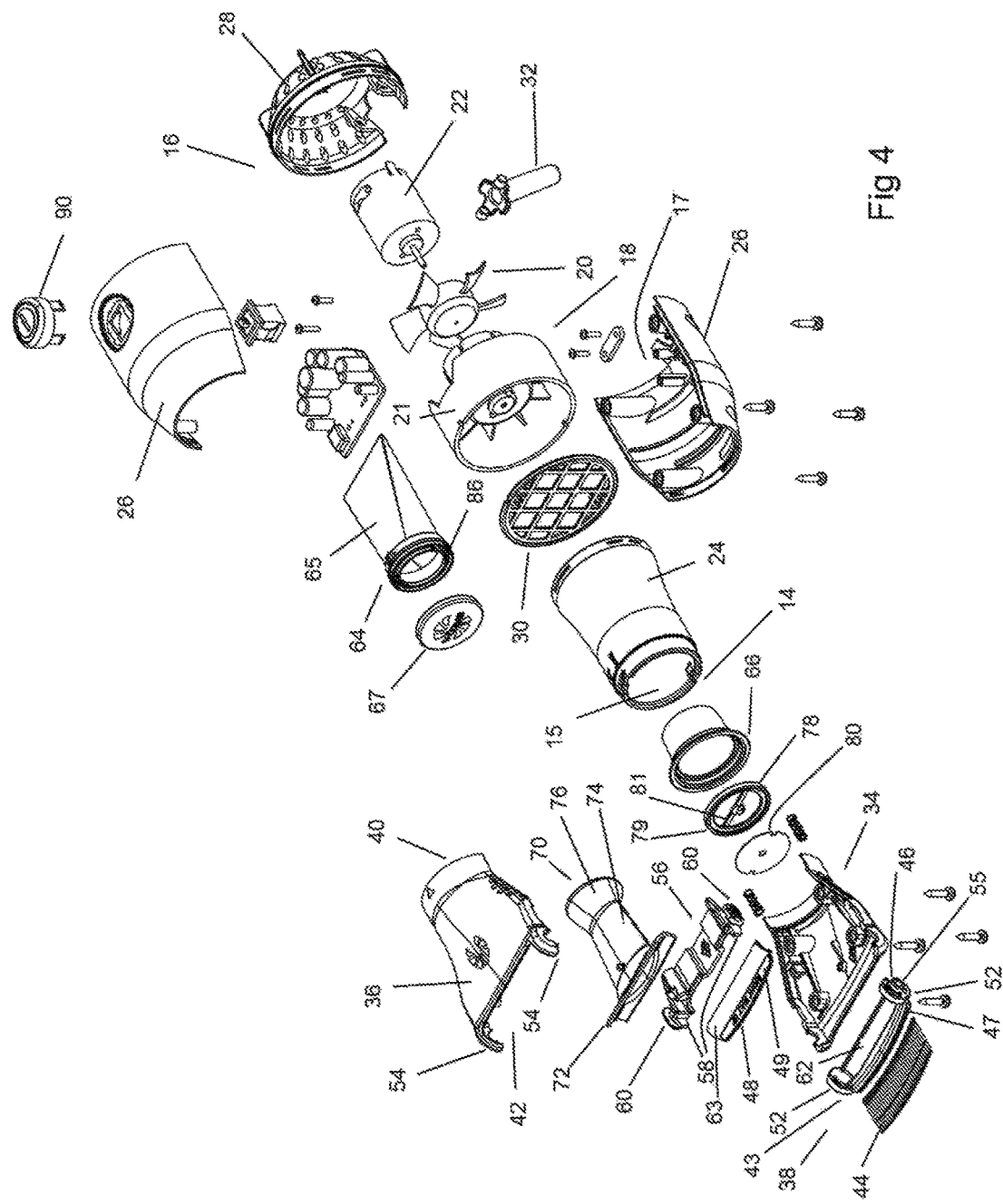
FIG. 4 is an exploded view of the lice removal device of FIG. 1.
Figure 5B:
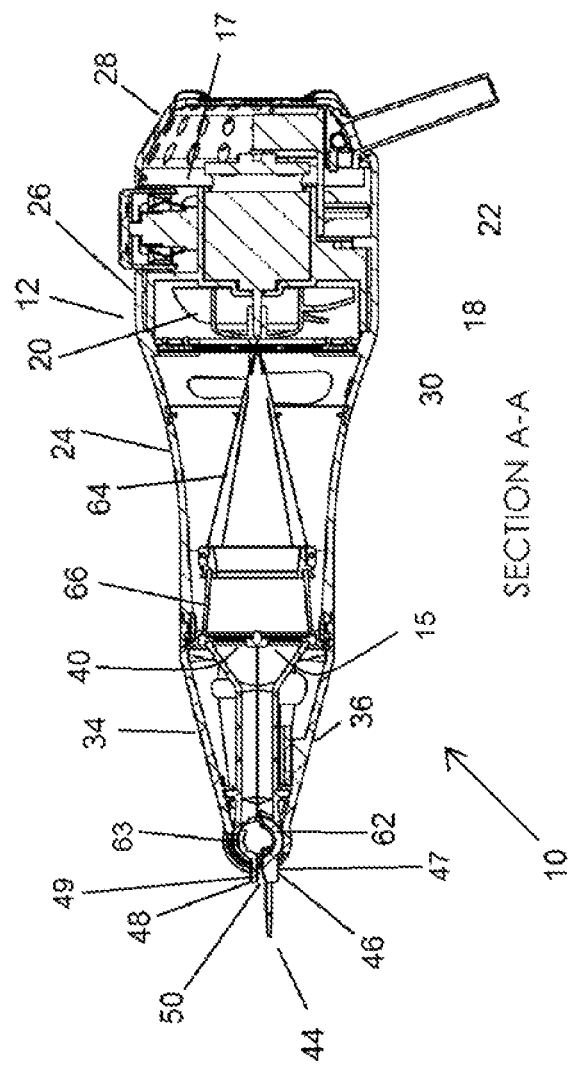
FIG. 5b is a side cross sectional view of the lice removal device of FIG. 5a through the line A-A.
Figure 5A:
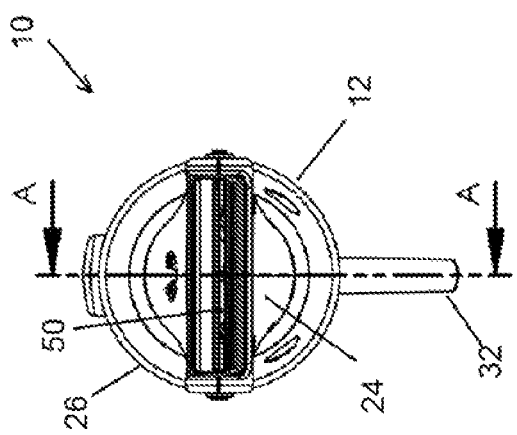
FIG. 5a is a front view of the lice removal device of FIG. 1.

The second housing portion 26 is formed of two semi-cylindrical portions (as can be seen in FIG. 4) secured together by appropriate fasteners. The second housing portion 26 of the main housing 12 includes a fan unit 18 therein. The fan unit 18 comprises a fan blade 20 driven by a motor 22. The fan blade 20 and the motor 22 are mounted to a fan housing 21 secured within the second housing portion 26 of the main housing 12. The fan blade 20 is rotatable about a central longitudinal axis of the main housing 12 and oriented such that rotation of the fan blade 20 draws air in through the first aperture 15 and out through the second aperture 17. That is, air is drawn by the fan unit 18 through the main housing 12 from the first end 14 to the second end 16.

The second end 16 of the main housing 12 includes a cover member 28. The cover member 28 is secured across the second opening 17 to prevent access to the fan unit 18 and includes a plurality of holes to allow air flow. A power cord 32 extends through the cover member 28 and connects to the motor 22 to provide power to drive the motor 22. A grill 30 is also provided adjacent the fan unit 18 on a side thereof adjacent the first housing portion 24.

A power button 90 is provided extending through the second housing portion 26. The power button 90 activates operation of the motor 22.

The first housing portion 24 comprises a tubular member having a circular transverse cross section. The main housing 12 is tapered adjacent the first end 14 thereof such that the first end 14 is of a reduced cross sectional area relative to the second end 16. In the embodiment shown, the first housing portion 24 tapers inwardly from adjacent the second housing portion 26 to the first end 14. The second housing portion 26 includes an inwardly tapering portion adjacent the first housing portion 24.

The lice removal device 10 comprises a comb unit 34 connectable to the first end 14 of the main housing 12. The comb unit 34 comprises a comb housing 36 and a blade unit 38. The comb housing 36 is hollow and includes a circular first end 40 securable to the first end 14 of the main housing 12. A second end of the comb housing 36 includes an elongate aperture 42 therein. The blade unit 38 is mounted adjacent the elongate aperture 42 in the second end of the comb housing 36.

The blade unit 38 includes a body 43 having a plurality of teeth 44 extending outwardly therefrom. The blade unit 38 is rotatable relative to the comb housing 36. The body 43 of the blade unit 38 comprises first side member 46 and a second side member 48. The first side member 46 includes a first planar first portion 47 located adjacent and parallel to the elongate aperture 42 in the comb housing 36. The teeth 44 extend outwardly from an outer edge of the first planar portion 47 of the first side member 46. The outer edge of the first planar portion 47 of the first side member 46 is arcuate in shape. The second side member 48 includes second planar portion 49. The second planar portion 49 is located adjacent and parallel to the first planar portion 47 such that an elongate opening 50 is defined between the first and second planar portions 47 and 49 of the blade unit 38. The outer edge of the second planar portion 49 is also arcuate in shape and located parallel and adjacent the outer edge of the first planar portion 47.

The first and second side members 46 and 48 also include respective first and second arcuate portions 62 and 63 on sides thereof opposite the teeth 44. The arcuate portions 62 and 63 are provided to seal across the elongate aperture 42 in the comb housing 36 such that the elongate aperture 42 is generally sealed by blade unit 38. Air is thereby directed to enter the comb unit 34 via the elongate opening 50. The arcuate portions 62 and 63 are located such that the arcuate portions 62 and 63 define a cylindrical shape having the elongate opening 50 adjacent a first side and a further elongate opening adjacent a second opposed side such that air drawn into the elongate opening 50 exits through the opposite further elongate opening.

The blade unit 38 includes first and second end members 52 connecting adjacent ends of the arcuate portions 62 and 63 of the first and second side members 46 and 48. In the embodiment shown, the end members 52 are circular and are formed integrally with the ends of the first arcuate portion 62. Ends of the second arcuate portion 63 are connectable to the end members 52.

The end members 52 are circular and include outwardly facing lugs 55 thereon. The comb housing 36 includes first and second mounting portions 54 extending from opposed ends of the elongate aperture 42. The mounting portions 54 include holes to receive the lugs 55 such that the blade unit 38 is rotatably mounted across the elongate aperture 42.

The blade unit 38 is mounted for rotation relative to the comb housing 36 such that the teeth 44 can move between a position in which the teeth are generally parallel to the longitudinal axis of the main housing 12 and one or more positions in which the teeth 44 are at an angle relative to the longitudinal axis of the main housing 12. The comb unit 34 includes also a latch member 56 which is moveable to fix the blade unit 38 in a plurality of angular orientations relative to the comb housing 36.

The latch member 56 is mounted for sliding movement within the comb housing 36 and includes lugs 58 provided to engage into notches provided around the periphery of the end members 52 of the blade unit 38. The latch member 56 is slidable between a first position in which the lugs 58 engage with the end members 52 and a second position in which the lugs 58 are disengaged from the end members 52. In the second position, the blade unit 38 is rotatable. The latch member 56 includes protrusions 60 on sides thereof which protrude out through slots in the comb housing 36 such that the protrusions 60 can be gripped to move the latch member 56 between the first and second positions. There is provided a pair of protrusions 60 located on each side of the comb housing 36 adjacent one of the mounting portions 54.

The comb housing 36 includes also an internal conduit 70. The internal conduit 70 comprises a flexible tube having an elongate mouth 72 adjacent a first end thereof. The elongate mouth 72 is to be arranged in use adjacent the elongate further opening of the blade unit 38. The conduit 70 includes a narrowed central portion 72 and a circular second end 74 provided adjacent the first end 40 of the comb housing 36. The conduit 70 thereby funnels any matter passing through the opening 50 to the first end 40 of the comb housing 36.

The lice removal device 10 includes a gate valve comprising a circular mounting 78 and a circular gate 80. The mounting 78 is secured adjacent the first end 40 of the comb housing 36. The gate 80 comprises a flexible disc mounted within the mounting 78. The mounting comprises a ring 79 having a cross member 81 extending diametrically across the ring 79. The gate 80 is secured across the mounting 78 such that a centre of the flexible disc is secured adjacent a centre of the cross member 81 on a side adjacent the comb housing 36. The flexibility of the gate 80 allows for airflow from the comb housing 36 into the main housing 12 to flex the gate 80 from a closed position, in which the gate 80 seals across the first aperture 15, to an open position in which sides of the gate 80 flex around the cross member 81, thereby allowing air flow into the main housing 12.

The lice removal device 10 includes also a filter 64 received in the main housing 12 adjacent the first end 14 thereof. The filter 64 comprises a tubular receptacle 65 having an open first end and a closed second end. In the embodiment shown, the filter 64 tapers inwardly towards the second end thereof. The filter 64 is received in the first aperture 15 such that the first end thereof is located adjacent the first aperture 15 and the filter 64 is contained within the first housing portion 24.

The filter 64 includes a plurality of lugs 82 provided in an annular channel around a neck portion 86 thereof. A securing member 66 is provided, onto which the filter 64 is to be secured. The securing member 66 comprises a cylindrical member received in the first aperture 15 such that a first end thereof is secured adjacent the first end 14 of the main housing 12. The filter 64 is secured to a second end of the securing member 66 by receiving the second end into the annular channel thereof. The second end of the securing member 66 includes an annular ridge on an inner side thereof which engages with the lugs 82. The securing member 66 therefore holds the filter 64 within the first housing portion 24 and air flowing into the first aperture 15 flows through the securing member and into the filter 64.

The filter 64 is provided with a cap 67. The cap 67 is provided to engage with and seal across the neck portion of the filter 64. The cap 67 is provided to seal the filter 64 for disposal to prevent escape of any lice captured within the filter 64. The cap also engages into the annular channel in the neck portion 86 of the filter 64.

The filter 64 may include one or more rings of adhesive material on an inner surface thereof to trap lice received in the filter 64. The filter 64 may also be provided with a chemical agent to kill the lice on an inner surface thereof.

In use, a filter 64 is inserted into the first main housing portion 24 and the blade unit 38 of the comb unit 34 moved to the most appropriate orientation for use. The fan unit 18 is activated and air is drawn across the surface of the teeth 44 and into the elongate opening 50. The air drawn in through the elongate opening 50 passes through the filter 64 and out through the second end 16 of the main housing 12. Any lice captured on the surface of the teeth 44 are thereby drawn into the filter 64 and trapped on the adhesive portions. When the filter 64 is to be replaced, the filter 64 may be removed and the neck portion 86 sealed with the cap 67.

It will be readily apparent to persons skilled in the relevant arts that various modifications and improvements may be made to the foregoing embodiments, in addition to those already described, without departing from the basic inventive concepts of the present invention.

What is claimed is:

1. A lice removal device comprising:
   a main housing including a first aperture at a first end thereof and a second aperture at a second end thereof;
   a fan unit provided within the main housing to draw air in through the first aperture and expel air outwardly through the second aperture; and
   a comb unit secured to the first end of the main housing, the comb unit comprising a comb housing and a blade unit, the blade unit being mounted for rotation relative to the comb housing;
   wherein the blade unit comprises first and second side members each including respective first and second planar portions, the second planar portion being located adjacent and parallel to the first planar portion to define an elongate opening and wherein a plurality of teeth extend outwardly from an outer edge of the first planar portion such that air is drawn across a first side of the teeth and into the elongate opening, the teeth being moveable between a position in which the teeth are generally parallel to a longitudinal axis of the comb housing and one or more positions in which the teeth are at an angle relative to the longitudinal axis of the comb housing.

2. A lice removal device in accordance with claim 1, wherein the first and second side members also include respective first and second arcuate portions on sides thereof opposite the teeth, the arcuate portions being provided to seal across the elongate aperture in the comb housing such that air is directed to enter the comb unit via the elongate opening.

3. A lice removal device in accordance with claim 2, wherein the arcuate portions are each located to define a cylindrical shape having the elongate opening adjacent a first side and a further elongate opening adjacent a second opposed side such that air drawn into the elongate opening exits through the opposite further elongate opening.

4. A lice removal device in accordance with claim 3, wherein first and second end members connect adjacent ends of the arcuate portions of the first and second side members, the end members being rotatably mounted to mounting portions provided on the comb housing adjacent ends of the elongate opening.

5. A lice removal device in accordance with claim 4, wherein the end members are circular and include outwardly facing lugs to engage into holes in the mounting portions such that the blade unit is rotatably mounted across the elongate aperture.

6. A lice removal device in accordance with claim 5, wherein the comb unit includes also a latch member which is moveable to fix the blade unit in a plurality of angular orientations relative to the comb housing.

7. A lice removal device in accordance with claim 6, wherein the latch member is mounted for sliding movement within the comb housing and includes lugs provided to engage into notches provided around the periphery of the end members of the blade unit in a first position and to disengage from the notches in a second position.

8. A lice removal device in accordance with claim 7, wherein the latch member includes protrusions on sides thereof which protrude out through slots in the comb housing such that the protrusions can be gripped to move the latch member between the first and second positions.

9. A lice removal device in accordance with claim 1, wherein a filter is received in the first aperture of the main housing to capture lice as air is drawn in from the comb housing and through the main housing.

10. A lice removal device in accordance with claim 9, wherein the filter comprises a tubular receptacle having an open first end and a closed second end.

11. A lice removal device in accordance with claim 10, wherein the filter is provided with a cap to engage with and seal across a neck portion of the filter.

12. A lice removal device in accordance with claim 9, wherein the filter includes one or more rings of adhesive material on an inner surface to trap lice received in the filter.

13. A lice removal device in accordance with claim 1, wherein a gate valve is provided adjacent the first end of the main housing such that air drawn into the main housing causes the gate valve to open and the gate valve closes when not air is flowing to prevent escape of lice.

14. A lice removal device in accordance with claim 13, wherein the gate valve comprises a flexible disc mounted within a mounting, the mounting comprises a ring having a cross member extending diametrically across the ring such that airflow into the main housing flexes the gate from a closed position, in which the gate seals across the first aperture, to an open position in which sides of the gate flex around the cross member, thereby allowing air flow into the main housing.

15. A lice removal device in accordance with claim 1, wherein the main housing comprises a first housing portion adjacent the first end and a second housing portion located adjacent the second end, wherein each of the first and second housing portions comprises a tubular member of circular transverse cross section and the second housing portion includes the fan unit therein.

16. A lice removal device in accordance with claim 15, wherein the main housing is tapered adjacent the first end thereof such that the first end is of a reduced cross sectional area relative to the second end.

17. A lice removal device in accordance with claim 16, wherein the first housing portion tapers inwardly from adjacent the second housing portion to the first end and the second housing portion includes an inwardly tapering portion adjacent the first housing portion.

18. A lice removal device in accordance with claim 15, wherein the second end of the main housing includes a cover member secured across the second opening having a plurality of holes to allow air flow.

19. A lice removal device in accordance with claim 18, wherein a power cord extends through the cover member connects to the motor to provide power to drive the motor.

20. A lice removal device in accordance with claim 15, wherein a grill is provided adjacent the fan unit on a side thereof adjacent the first housing portion.

* * * * *